United States Patent
Munster et al.

(10) Patent No.: US 9,132,723 B2
(45) Date of Patent: *Sep. 15, 2015

(54) DRIVE DEVICE FOR DRIVING A WHEEL FOR AN ELECTRICALLY POWERED VEHICLE

(75) Inventors: Martin Munster, Munchen-Liam (DE); Stephan Pollmeyer, Friedrichshafen (DE); Jens Heimann, Stetten (DE); Ulrich Mair, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/004,739

(22) PCT Filed: Feb. 1, 2012

(86) PCT No.: PCT/EP2012/051640
§ 371 (c)(1),
(2), (4) Date: Sep. 12, 2013

(87) PCT Pub. No.: WO2012/123175
PCT Pub. Date: Sep. 20, 2012

(65) Prior Publication Data
US 2014/0000970 A1    Jan. 2, 2014

(30) Foreign Application Priority Data
Mar. 16, 2011 (DE) .................. 10 2011 005 616

(51) Int. Cl.
*B60K 7/00* (2006.01)
*B60K 1/00* (2006.01)
*B60K 17/04* (2006.01)

(52) U.S. Cl.
CPC ............... *B60K 1/00* (2013.01); *B60K 7/0007* (2013.01); *B60K 17/046* (2013.01); *B60K 2007/0038* (2013.01); *B60K 2007/0061* (2013.01)

(58) Field of Classification Search
CPC .................... B60K 7/0007; B60K 2007/0038; B60K 2007/0046; B60K 2007/0053; B60K 17/046; B60K 1/00; B60K 2007/0061
USPC ..................... 180/65.51, 65.6, 65.7
See application file for complete search history.

(56) References Cited

U.S. PATENT DOCUMENTS 2,142,872 A * 1/1939 Haushalter ............... 267/281
4,984,645 A * 1/1991 White, Jr. .................. 180/65.6

(Continued)

FOREIGN PATENT DOCUMENTS

DE      41 34 840 A1     4/1993
DE      94 15 068 U1    11/1995

(Continued)

OTHER PUBLICATIONS

Prexler, F.: Antriebstechnik. Fahrzeuggetriebe fur elektromotorisch betriebene Elektroleichtfahrzeuge, VDI Berichte Nr. 1175, 1995, Seiten 593-602, See German Search.

(Continued)

*Primary Examiner* — Hau Phan
*Assistant Examiner* — Jacob Meyer
(74) *Attorney, Agent, or Firm* — David & Bujold, P.L.L.C.; Michael J. Bujold

(57) ABSTRACT

A drive device (11) for driving a wheel (7) of an electrically powered vehicle having an electric machine (12) and a transmission unit. The transmission unit has a spur gear transmission (14) and a planetary transmission (13) which, when viewed in the direction of the flow of force during a traction operation, is positioned on the output side of the electric machine (12) in the sequence of the planetary transmission (13) and then the spur gear transmission (14).

13 Claims, 2 Drawing Sheets

(56) References Cited

U.S. PATENT DOCUMENTS

| | | | |
|---|---|---|---|
| 5,168,946 A | 12/1992 | Dorgan | |
| 6,540,632 B1 | 4/2003 | Wendl et al. | |
| 6,768,932 B2* | 7/2004 | Claypole et al. | 700/279 |
| 7,712,561 B2 | 5/2010 | Niwa | |
| 7,841,435 B2* | 11/2010 | Raue | 180/65.51 |
| 8,424,625 B2* | 4/2013 | Ishii | 180/65.31 |
| 8,640,800 B2* | 2/2014 | Armbruster et al. | 180/65.6 |
| 8,640,801 B2* | 2/2014 | Hennings et al. | 180/65.6 |
| 2004/0124019 A1* | 7/2004 | Harrup et al. | 180/65.1 |
| 2005/0236198 A1* | 10/2005 | Jenkins | 180/65.5 |
| 2006/0054368 A1* | 3/2006 | Varela | 180/65.5 |
| 2006/0180366 A1* | 8/2006 | Brill et al. | 180/65.6 |
| 2006/0213701 A1* | 9/2006 | Durif | 180/24 |
| 2007/0181357 A1* | 8/2007 | Saito et al. | 180/65.5 |
| 2008/0018064 A1* | 1/2008 | Martin et al. | 280/6.152 |
| 2008/0053725 A1 | 3/2008 | Kramer | |
| 2009/0032321 A1* | 2/2009 | Marsh et al. | 180/65.51 |
| 2011/0209934 A1* | 9/2011 | Armbruster et al. | 180/65.25 |
| 2012/0103708 A1* | 5/2012 | Hennings et al. | 180/65.6 |
| 2012/0142487 A1* | 6/2012 | Winter et al. | 475/332 |
| 2014/0011620 A1* | 1/2014 | Munster et al. | 475/149 |

FOREIGN PATENT DOCUMENTS

| | | |
|---|---|---|
| DE | 44 34 237 A1 | 3/1996 |
| DE | 199 32 587 A1 | 1/2001 |
| DE | 102 02 053 A1 | 7/2003 |
| DE | 10 2005 035 312 A1 | 3/2007 |
| DE | 10 2007 039 059 A1 | 2/2009 |
| DE | 10 2009 036 299 A1 | 2/2011 |
| DE | 10 2010 010 438 A1 | 9/2011 |
| EP | 1 961 602 A1 | 8/2008 |
| JP | 2001-315534 A | 11/2001 |
| JP | 2001315534 A * | 11/2001 |
| WO | 2008/017945 A1 | 2/2008 |
| WO | 2011/003489 A1 | 1/2011 |
| WO | 2011/015277 A1 | 2/2011 |

OTHER PUBLICATIONS

German Search Report Corresponding to 10 2011 005 616.5 mailed Dec. 19, 2011.

German Search Report Corresponding to 10 2011 005 623.8 mailed Dec. 20, 2011.

International Search Report Corresponding to PCT/EP2012/051640 mailed May 7, 2012.

International Search Report Corresponding to PCT/EP2012/051641 mailed May 9, 2012.

Written Opinion Corresponding to PCT/EP2012/051640 mailed May 7, 2012.

Written Opinion Corresponding to PCT/EP2012/051641 mailed May 9, 2012.

* cited by examiner

DRIVE DEVICE FOR DRIVING A WHEEL FOR AN ELECTRICALLY POWERED VEHICLE

This application is a National Stage completion of PCT/EP2012/051640 filed Feb. 1, 2012, which claims priority from German patent application serial no. 10 2011 005 616.5 filed Mar. 16, 2011.

FIELD OF THE INVENTION

The present invention concerns a drive device to drive a wheel of an electrically powered vehicle.

BACKGROUND OF THE INVENTION

Generally, the drive train configuration in an electrically driven vehicle is the same configuration as in vehicles which have a central drive, comprising a combustion engine. Hereby, a drive device which comprises of an electric machine, a transmission, and a differential which is fixed to the chassis in a position in the center of the vehicle between the front wheels and the rear wheels; the drive torque is transferred like in conventional central drives via side shafts to the driven wheels. In such a configuration of the drive train, the chassis concept is mostly maintained, wherein only modifications in the aggregate bearings and auxiliary frames are required.

In an electrically driven or rather drivable vehicle which comprises a central drive, accommodating the battery represents a significant construction modification. It is known hereby that the battery needs to be integrated, for instance under the back seat or in an area which is usually occupied by the transmission duct in central drives having a combustion engine.

Also, electric drives that are arranged near the wheels are known in the state-of-the-art, wherein near the wheel means a drive in the broader sense which has one or several electric motors for each driven wheel of a vehicle. Therefore, vehicles are known which have two or more driven wheels which have a corresponding number of drives, meaning two or more. Hereby each electric motor can precisely drive one drive wheel.

In addition, known in the state of the art are electric drives arranged close to the wheel so as to drive a driven wheel for electrically driven vehicles which are integrated into the chassis of the vehicle whereby, depending on the number of driven wheels of the vehicle, either two or four electric drives are provided.

Wherein, the electric drives can be positioned fixed to the wheel carrier; in this case, the electric drive swings directly with the respective wheel and the unsuspended mass is directly influenced by the drive.

Another possibility for positioning, the electric drives which are close to the wheel can be fixed in position. Hereby, the electric drives are moved from the center of the vehicle towards the wheels. The drives are, however, still attached to the chassis structure and therefore do not influence the unsuspended masses.

The electric drives can also be positioned at suspension rods, whereby they are attached in this case at the chassis suspension rods, for instance at the torsion rods. In this concept, the unsuspended mass is reduced by positioning the electric drives close to the chassis-fixed connection points of the suspension rod.

Known through the DE 10 2007 039 059 A1 by the applicant is a driven vehicle axle, designed as a torsion rod axle, in which each wheel of the axle has an electric motor assigned to it which is positioned with the rotational axis in the longitudinal direction of the vehicle, whereby its housing represents a part of the longitudinal swing part of the torsion rod.

The drives which are close to the wheel can be utilized in vehicles with an all-wheel, front, or rear drive, whereby the type of axles of the driven vehicle axles can be conventional axle types, such as for instance strut axles or double wishbone axles. In addition the drives close to the wheel can be integrated with the wheel integrated chassis.

Also, the electric drives which are close to the wheel can have a transmission.

Known through WO 2008/017945 A1 is a drive device, which can be integrated into a wheel of a vehicle, to drive the wheel where the device comprises of an electric motor and a transmission device, wherein the transmission device comprises a spur gear transmission and a planetary transmission which are connected in series. Hereby, the planetary transmission is positioned, viewed in the flow of force direction in traction operation, at the output side of the spur gear transmission.

The use of electric drives close to the wheel for driving a wheel of a driven axle results, in an advantageous manner, in a vehicle configuration with a high flexibility, because of the elimination of the central drive in the center of the vehicle creates, and new degrees of freedom in the vehicle design, in particular during the design of the interior of the vehicle, the battery accommodation, and the crash safety.

In addition, drives torques can be generated at individual wheels through electric drives near the wheel, whereby functions such as torque vectoring, ESP, ABS, ASR, etc. can be realized in a simple way. Through the fast and accurate control of electric drives, these functions can be optimized in comparison to the traditional, brake based control systems.

SUMMARY OF THE INVENTION

The objective of the present invention is to present a drive device for the drive of a wheel for an electrically driven vehicle.

Thus, a drive device for the drive of a wheel of a torsion rod axle for an electrically driven vehicle is proposed, comprising an electric machine and a transmission unit, whereby the transmission unit has a spur gear transmission and a planetary transmission which is positioned, when viewed in the flow of force direction in a traction-mode, on the output side of the electric machine in the sequence of the planetary gear-spur gear transmission.

The planetary transmission is positioned coaxial to the rotor of the electric machine, wherein the spur gear transmission is positioned axially parallel to the rotor of the electric machine. The drive device is positioned axially parallel to the wheel axis.

In this concept, the axial offset is used to reduce the distance between the center of gravity of the drive device and the point of rotation, around which the wheel axis moves, relative to the vehicle construction, which again results in a reduction of the unsuspended mass. Preferably, the drive device is positioned between the center of the wheel and the point of rotation, within the point of rotation, or in the center of the wheel which is facing away from the point of rotation.

Through the combination of the planetary transmission with a spur gear transmission, a large gear ratio is made possible while the dimensions, as well as the weight of the electric machine and therefore the unsuspended mass, can be kept low; for instance, the achieved gear ratio can be a value larger than 10, due to the two transmissions. Preferably, the gear ratio, meaning the ratio between the rotational speed the driveshaft of the transmission in comparison to the rotational speed of the output shaft of the transmission, has a value larger than 10, preferably between 13 and 18, in particular the value 16. Hereby, the distribution of the achievable gear ratios to the transmissions can be performed symmetrically or asymmetrically.

The combination of a low drive torque with the use of high rotational ratios, as a sum and in connection with the two transmission of the drive device, results in an advantageous manner in a large power performance/weight ratio (kW/kg). The electric machine can therefore have small dimensions, which advantageously enables or rather simplifies, the integration of the electric machine into the trailing arm.

Also, the use of a spur gear enables an offset between the driveshaft of the electric machine and the wheel axle, so that the electric machine can be moved on the trailing arm further in the direction of the connection point of the trailing arm, therefore lowering the unsuspended mass.

By positioning of the spur gear, which is reduced in size, in the direction of force after the planetary transmission, it becomes possible to maintain the position of the spring and the damper in the proximity of the wheel center and to enable a favorable reaction and tuning behavior.

By using the transmissions with a high rotational speed electric motor, like a machine with a maximal rotational speed of more than 15,000 rpm, preferably between 18,000 and 22,000 rpm, in particular 21,000 rpm, this enables positioning the planetary transmission immediately following the electric machine with lesser sound than when using a spur gear in the same position, because the planetary transmission is generally designed more compact and the housing surfaces, which transmit sound, in the area of the high-speed transmission section are reduced.

A housing of the drive device can serve as a wheel carrier, as a wheel mounted suspension rod, or as part of the wheel carrier and pass created forces into the chassis.

Preferably the electric machine and the transmission unit are positioned in such a way that, in a primary position of operation of the vehicle, the lubrication material flows back due to gravity into the oil sump in the transmission space, whereby for this purpose the housing of the electric machine is designed in a way that sufficient lubrication of the bearings of the rotor shaft is guaranteed. This creates the advantage that the necessity of providing connecting or non-connecting gaskets, in particular for fast rotating shafts of the drive device can be omitted, and the losses of lubricant and the creation of heat is reduced.

Within the framework of a further embodiment of the invention, it is proposed to connect the housing of the drive device directly to the trailing arm of the torsion rod axle, for instance to screw it together, to integrate it as a multi-part welded component with the trailing arm, or to design it as one part with the trailing arm.

Within the framework of a further embodiment, the electric machine and the planetary transmission can have a common housing.

Also, the connection of the brake caliper, in the case of a disc brake and/or the damper and/or the spring, can be integrated in the housing of the drive device, whereby the connecting screws for attaching the brake caliper are at the same time the screws for the housing and for the attachment of the drive device at the trailing arm of the axle.

Through this, a compact construction is achieved and there is no need for separate components which results in a reduction of the cost.

The drive device can in particular be combined with a torsion rod, a central control arm axle, a suspension arm axle, or a trailing arm axle. Hereby, a torsion rod axle is for instance meant as an axle with two trailing arms and a crossmember which connects them. A central control arm axle is meant to be an axle with two trailing arms, whereby each trailing arm is connected with two crossmembers, which are mounted to the chassis. A suspension arm axle has at each wheel an approximately triangular swing arm which is connected with the two ends at the chassis and with the apex at the wheel carrier. A trailing arm axle is an axle which has at each wheel a trailing arm which is on one side connected with the chassis and on the other side with the wheel.

BRIEF DESCRIPTION OF THE DRAWINGS

The invention is further explained in the following based on the attached drawings, whereby for the same parts, the same reference characters are used. These show.

DETAILED DESCRIPTION OF THE PREFERRED EMBODIMENTS

Figure 1:
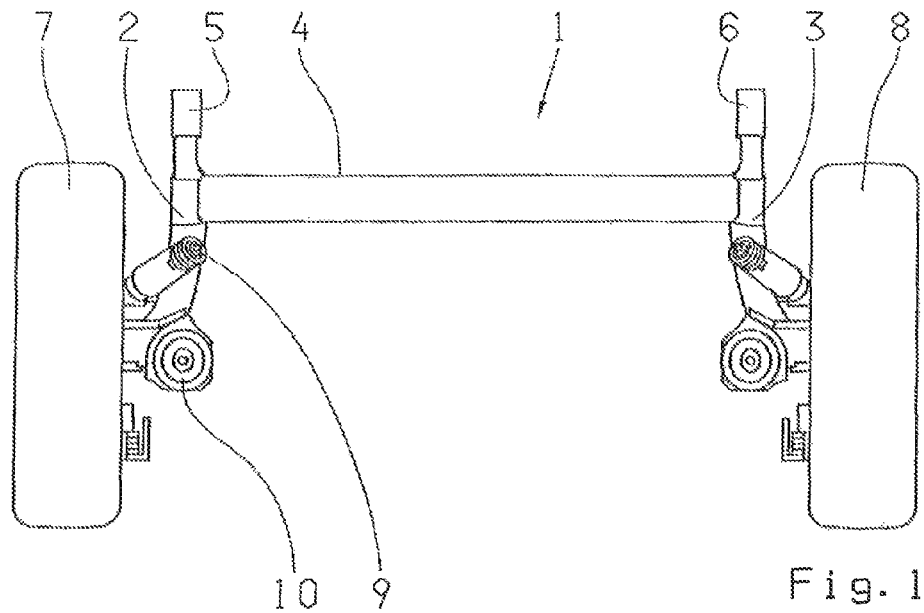
FIG. 1 a schematic top view of a designed torsion rod rear axle as in the state-of-the-art.

In reference to FIG. 1, a rear torsion rod axle 1, as in the state-of-the-art, comprises of two trailing arms 2, 3 which are connected with each other through a cross-section 4.

The rear torsion rod axle 1 is screwed together through two rubber bearings 5, 6 with the chassis of the vehicle. The wheels of the rear torsion rod axle 1 are marked in the drawing with the reference characters 7 or 8, respectively. In addition, the attached FIG. 1 shows a damper 9 and a spring 10 of the axle 1.

Figure 2:
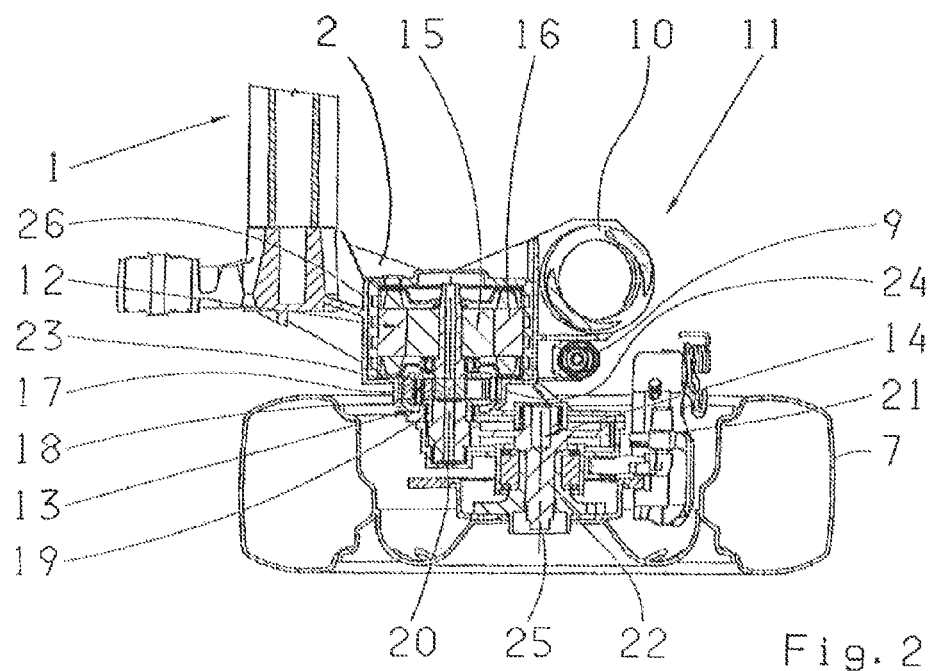
FIG. 2 a schematic sectional view of a first embodiment of an inventive drive device for an electrically driven vehicle and the positioning of the drive device.

The embodiment shown in FIG. 2 of the invention presents a drive device 11 for driving a wheel 7 of a torsion rod axle 1 of an electrically driven vehicle which has an electric machine 12 and a transmission unit which comprises of a spur gear transmission 14 and a planetary transmission 13 which, when viewed in the direction of the power flow during traction operation, are positioned towards the output, after the electric machine 12 in the sequence of the planetary transmission 13—the spur gear transmission 14. The planetary transmission 13 and the spur gear transmission 14 are in this example, axially viewed, positioned on the side of the electric machine 12 facing the wheel 7.

In the shown example, the rotor 15 of the electric machine 12, which is designed as an inner rotor, is connected via a sun gear shaft with the sun gear 17 of the planetary transmission 13, whereby the carrier 18 of the planetary transmission 13 is connected, via a carrier shaft 19, to the pinion 20 (meaning with the small gear) of the spur gear transmission, which meshes with the spur gear 21 (meaning with the large gear). The spur gear 21 is connected with the wheel hub 22 of the wheel 7, preferably by means of a pluggable spline shaft connection or a polygon profile, or designed as one part with the wheel hub 22, whereby the installation and manufacturing costs are reduced. The connection between the carrier shaft 19 and the pinion 20 is preferably axially and radially supported through roller bearings, slide bearings, or thrust washers. The stator of the electric machine in FIG. 2 is marked with the reference character 16.

In addition, the ring gear 23 of the planetary transmission 13 is fixed in positioned to the housing; it can be coupled to the housing 24 of the planetary transmission 13, designed as one part with the housing 24, or press-fit into the housing 24. In the case that the ring gear 23 is designed as one part with the housing 24, a radial recess can be provided to compensate for the difference in the diameters between the housing 24 and the ring gear 23. If the ring gear 23 is designed as a ring gear ring which can be press-fit into a cylindrical housing, the material can be selected depending on the load, which might result in a reduction of the weight.

The planetary transmission 13 and the electric machine 12 can have a common housing within the framework of a further embodiment. In the example which is shown in FIG. 2, the housing of the electric machine 12 is marked with the reference character 26.

In addition, the rotor shaft 15 of the electric machine 12 can be designed as one part with the sun gear shaft; the carrier shaft 19 can also be designed as one part with the pinion 20.

Within the framework of additional, not here presented embodiments, the drive and/or the output of the planetary transmission 13 can take place via an additional element of the planetary transmission.

The gearing is preferably of a helical design, whereby the bearing of the sun gear shaft of the planetary transmission 13 is formed through the bearing on the drive side of the rotor 15 of the electric machine 12, so that the need for separate bearings can be omitted, whereby the bearing of the rotor 15 of the electric machine 12, facing away from the sun gear 17 of the planetary transmission 13, can be preferably axially pre-loaded through a spring element.

Hereby, the helix angle of the sun gear 17 of the planetary transmission 13 is preferably opposite to the helix angle of the pinion 20 of the spur gear transmission 14. In addition, the directions of the helix angle of the sun gear 17 of the planetary transmission 13 and the pinion 20 of the spur gear transmission 14 preferably need to be selected in a way such that the load at the bearings of the drive device 11 are minimized. Thus, friction losses are minimized and smaller dimensions of the bearings are made possible. The amount and the sign of the helix angle of the spur gear 16 can be selected in an advantageous way so that the loads of a conventional wheel bearing can be accommodated.

Also, the bearing of the output 25 of the drive device 11, meaning a shaft 25 which is connected with the spur gear 21, forms the wheel bearing of the wheel 7, which can be designed as a bearing in a conventional construction, for instance having a two-row roller bearing, or as a bearing which comprises two single helix roller bearings with a contact angle of between 15° and 60°. Therefore, the number of bearings of the drive device can be reduced in an advantageous way.

In accordance with the invention, a housing of the drive device 11, particularly in the case of the design according to FIG. 2, the housing 26 of the electric machine 12 is directly connected to the trailing arm 2 of the torsion rod axle 1, preferably by screws. As an alternative, the housing 26 of the electric machine 12 can also be integrated into the trailing arm 2 as a multi-part welded component, or can be designed as one part with the trailing arm 2. In addition, the electric machine 12 can be inserted like a cartridge into the trailing arm 2 which serves in this case as a common housing.

In the framework of a further embodiment of the invention, the connection of the brake caliper in the case of a disc brake and/or the damper 9 and/or the spring 10 are integrated into a housing of the drive device 11, in particular in the case of a design in accordance with FIG. 2, into the housing 26 of the electric machine 12, whereby the connecting screws for fixing the brake caliper can be at the same time the housing screws used for attaching the drive device 11 to the trailing arm 2 of the axle.

Hereby, a compact construction is achieved and the need for additional parts can be omitted, which results in a reduction of the cost.

Figure 3:
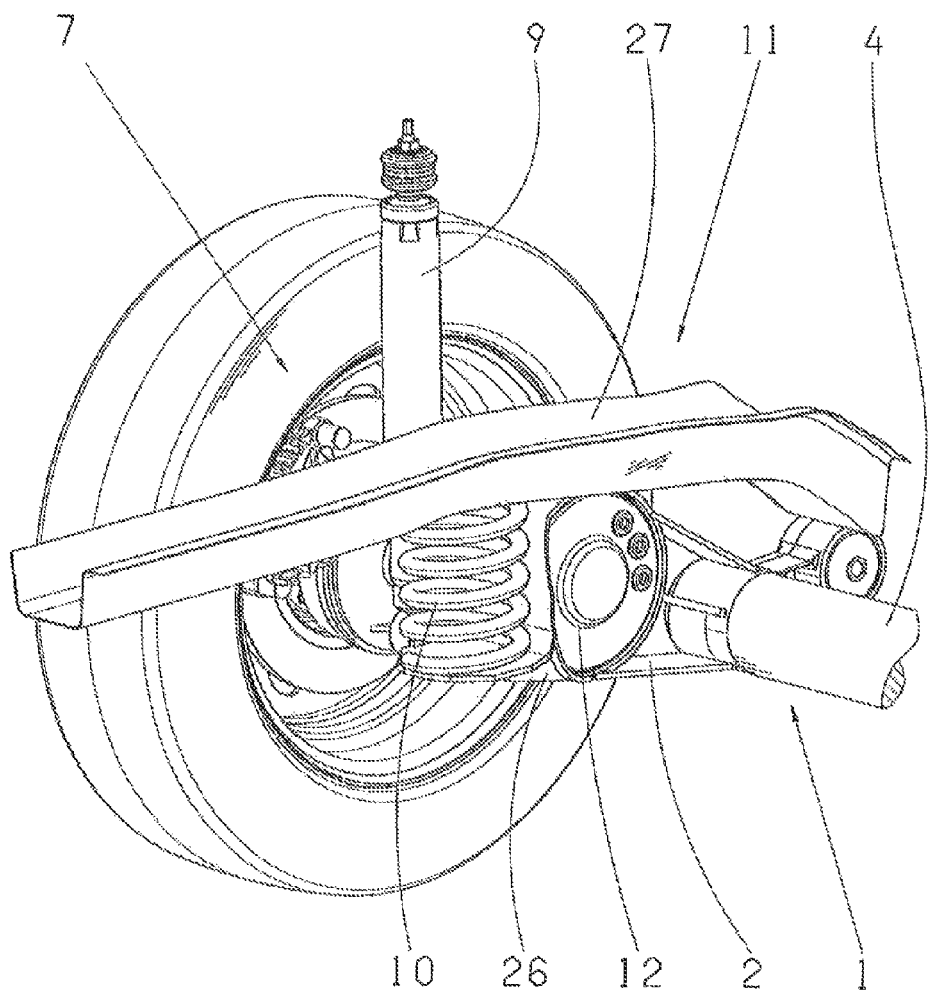
FIG. 3 a perspective view of the configuration of an inventive drive device.

FIG. 3 shows as an example the integration of the connection of the damper 9 and the spring 10 with the housing 26 of the electric machine 12, as well as the direct connection of the housing 26 of the electric machine 12 with the trailing arm 2.

Within the framework of an embodiment of the invention which is not shown here, the electric machine 12 can be designed as a hollow shaft motor, meaning that the inner rotor can be designed as a hollow shaft rotor 15, whereby the planetary transmission 13 is positioned at the side of the electric machine 12 which is facing a way from the wheel 7, that the spur gear transmission 14 is positioned on the side of the electric machine 12 facing the wheel 7, and that the carrier shaft 19 of the planetary transmission 13 is passes through the cavity of the rotor 15 of the electric machine 12 to the pinion 20 of the spur gear transmission 14. In such a design, the housing 24 of the planetary transmission 13 can for instance be directly connected with the trailing arm 2 of the torsion rod axle 1.

By swapping the positions of the electric machine 12 and the planetary transmission 13, in comparison to the embodiment example in FIG. 2, the advantage is achieved that in the area of the chassis longitudinal beam the construction space is provided which can be used during deflections, because the housing 24 of the planetary transmission 13 can be designed with a smaller outer diameter than the housing 26 of the electric machine 12.

The electric machine 12 of the drive device 11 can be designed as an asynchronous machine, as an externally or permanent magnet excited synchronous machine or as a transverse field machine, which offers a large flexibility.

Through the inventive concept, a very compact construction of the drive device can be realized, with a low unsuspended mass and a large power/weight ratio (kW/kg).

The presented drive device can also be combined with any axle types, for instance with a central control arm axle, control arm, trailing arm, suspension arm, or trapezoidal arm axles.

In addition, the drive device has a low number of bearings and offers sufficient access, whereby it can be integrated with an existing axle with just little modification. For instance, in the case of a torsion rod axle, just the trailing arm needs to be replaced with a modified part.

Also, the braking device for the wheels can be designed as disc brake or drum brake; the drive device can be designed as air cooled or fluid cooled, whereby the electric machine, the planetary transmission and the power electronics can have a common cooling. The power electronics can also be fixed to the wheel or to the engine.

Furthermore, the spring 10 is mounted at the longitudinal beam of the chassis 27.

REFERENCE CHARACTERS

1 Torsion Beam—Rear Axle
2 Trailing Arm
3 Trailing Arm
4 Cross-Section
5 Rubber Bearing
6 Rubber Bearing
7 Wheel 8 Wheel
9 Damper
10 Spring
11 Drive Device
12 Electric Machine
13 Planetary Transmission
14 Spur Gear Transmission
15 Rotor
16 Stator
17 Sun Gear of the Planetary Transmission 13
18 Carrier of the Planetary Transmission 13
19 Carrier Shaft
20 Pinion
21 Spur Gear
22 Wheel Hub
23 Ring Gear 23 of the Planetary Transmission 13
24 Housing 24 of the Planetary Transmission 13
25 Output of the Drive Device 11
26 Housing of the Electric Machine 12
27 Longitudinal Beam

The invention claimed is:

1. A drive device (11) for driving a wheel (7) of an electrically powered vehicle, the drive device including a housing and comprising:
an electric machine (12), and
a transmission unit,
the transmission unit having a spur gear transmission (14) and a planetary transmission (13) which, when viewed in a direction of a flow of force during a traction operation, being positioned on an output side of the electric machine (12) in a sequential order of the planetary transmission (13) and then the spur gear transmission (14),
the planetary transmission (13) and the spur gear transmission (14) having mating helical gears, and
the housing of the drive device (11) being directly connected and integrated into a trailing arm of an axle (1), adjacent a connection point of the drive device with the trailing arm, so as to lower an unsuspended mass of the drive device (11).

2. The drive device (11) for driving the wheel (7) of the electrically driven vehicle according claim 1, wherein a rotor (15) of the electric machine (12), which is designed as an inner rotor, is connected via a sun gear shaft (17) of the planetary transmission, a carrier (18) of the planetary transmission (13) is connected via a carrier shaft (19) with a pinion (20) of the spur gear transmission (14), which meshes with a spur gear (21), which is either connected with the wheel hub (22) of the wheel (7) or is designed as one part with the wheel hub (22), and a ring gear (23) of the planetary transmission (13) is fixedly attached to a housing.

3. The drive device (11) for driving the wheel (7) of the electrically driven vehicle according to claim 2, wherein at least one of:
the rotor (15) of the electric machine (12) is designed as one part with the sun gear shaft, and
the carrier shaft (19) is designed as one piece with the pinion (20).

4. The drive device (11) for driving the wheel (7) of the electrically driven vehicle according to claim 1, wherein the planetary gear (13) and the spur gear transmission (14), when viewed axially, are positioned on a side of the electric machine (12) facing the wheel (7).

5. The drive device (11) for driving the wheel (7) of the electrically driven vehicle according to claim 1, wherein a housing (24, 26) of the drive device (11) is directly connected with the trailing arm (2), and the trailing arm (2) is part of a torsion rod axle (1).

6. The drive device (11) for driving the wheel (7) of the electrically driven vehicle according to claim 5, wherein the housing (24, 26) is at least one of screwed to the trailing arm, integrated into the trailing arm (2) as a multi-part welded component, and designed as a single part with the trailing arm (2).

7. The drive device (11) for driving the wheel (7) for the electrically driven vehicle according to claim 1, wherein the axle is one of a torsion beam axle, a trailing arm axle, torsion rod axle (1), a central arm axle and a suspension arm axle.

8. The drive device (11) for driving the wheel (7) for the electrically driven vehicle according to claim 1, wherein a ratio between a rotational speed of a drive shaft of the transmission unit compared to a rotational speed of an output shaft of the transmission unit is approximately 16.

9. The drive device (11) for driving the wheel (7) for the electrically driven vehicle according to claim 1, wherein the electric machine has a maximum rotational speed of approximately 21,000 rpm.

10. The drive device (11) for driving the wheel (7) for the electrically driven vehicle according to claim 1, wherein the electric machine and the transmission unit are positioned in such a way that, in a primary position of operation of the vehicle, a lubrication material flows back due to gravity into an oil sump in a space in the transmission.

11. The drive device (11) for driving the wheel (7) for the electrically driven vehicle according to claim 1, wherein both connecting and non-connecting gaskets for fast rotating shafts of the drive device are omitted.

12. A drive device (11) for driving a wheel (7) of an electrically powered vehicle, the drive device comprising:
an electric machine (12), and
a transmission unit,
the transmission unit having a spur gear transmission (14) and a planetary transmission (13) which, when viewed in a direction of a flow of force during a traction operation, being positioned on an output side of the electric machine (12) in a sequential order of the planetary transmission (13) and then the spur gear transmission (14),
a housing of the drive device (11) being directly connected and integrated into a trailing arm of an axle (1), adjacent a connection point of the drive device (11), and
a bearing of an output (25) of the drive device (11) is formed by a wheel bearing of the wheel (7).

13. A drive device for driving a wheel of an electrically powered vehicle, the drive device comprising:
an electric machine; and
a transmission unit;
the transmission unit having a spur gear transmission and a planetary transmission which, when viewed in a direction of a flow of force during a traction operation, being positioned on an output side of the electric machine in a sequential order of the planetary transmission and then the spur gear transmission; and
the drive device being positioned at a trailing arm of an axle;
wherein the axle is one of a torsion beam axle, a trailing arm axle, torsion rod axle (1), a central arm axle and a suspension arm axle; and
the drive device (1) is positioned between a connecting point of the wheel at the trailing arm and a connecting point of the trailing arm at either a chassis of the vehicle or an auxiliary frame.

* * * * *